United States Patent [19]

Tallent et al.

[11] 4,316,776
[45] Feb. 23, 1982

[54] METHOD OF REMOVING PU(IV) POLYMER FROM NUCLEAR FUEL RECLAIMING LIQUID

[75] Inventors: Othar K. Tallent; James C. Mailen, both of Oak Ridge; Jimmy T. Bell, Kingston; Phillip C. Arwood, Harriman, all of Tenn.

[73] Assignee: The United States of America as represented by the United States Department of Energy, Washington, D.C.

[21] Appl. No.: 221,745

[22] Filed: Dec. 31, 1980

[51] Int. Cl.³ .................. C25C 1/22; C01G 56/00; C01G 57/00
[52] U.S. Cl. .................. 204/1.5; 204/140; 423/3; 423/251
[58] Field of Search ............. 204/140, 186, 130, 1.5; 423/3, 7, 10, 251; 210/748

[56] References Cited
PUBLICATIONS

The Preparation and Properties of Some Plutonium Compounds, Part V, Colloidal Quadivalent Plutonium, J. Chem. Soc., p. 3358, 1956, by Ockenden and Welch.
Hazards and Experimental Procedure Evaluation For: Studies on the Polymerization and Hydrolysis of Plutonium in Uranyl Nitrate and Nitric Acid Solutions at Elevated Temperatures, published in 1963 by Biggers and Costanzo.
A Study of the Polymerization, Depolymerization, and Precipitation of Tetravalent Plutonium as Functions of Temperature and Acidity by Spectrophotometric Methods: Preliminary Report, published in 1963 by Beggers and Costanzo.
Plutonium Handbook, A Guide to the Technology, vol. 1, section 13-2.2, published in 1967 by Gordon and Breach, Science Publishers.

*Primary Examiner*—T. M. Tufariello
*Attorney, Agent, or Firm*—Edwin G. Grant; Stephen D. Hamel; Richard G. Besha

[57] ABSTRACT

A Pu(IV) polymer not extractable from a nuclear fuel reclaiming solution by conventional processes is electrolytically converted to $Pu^{3+}$ and $PuO_2^{2+}$ ions which are subsequently converted to $Pu^{4+}$ ions extractable by the conventional processes.

2 Claims, 1 Drawing Figure

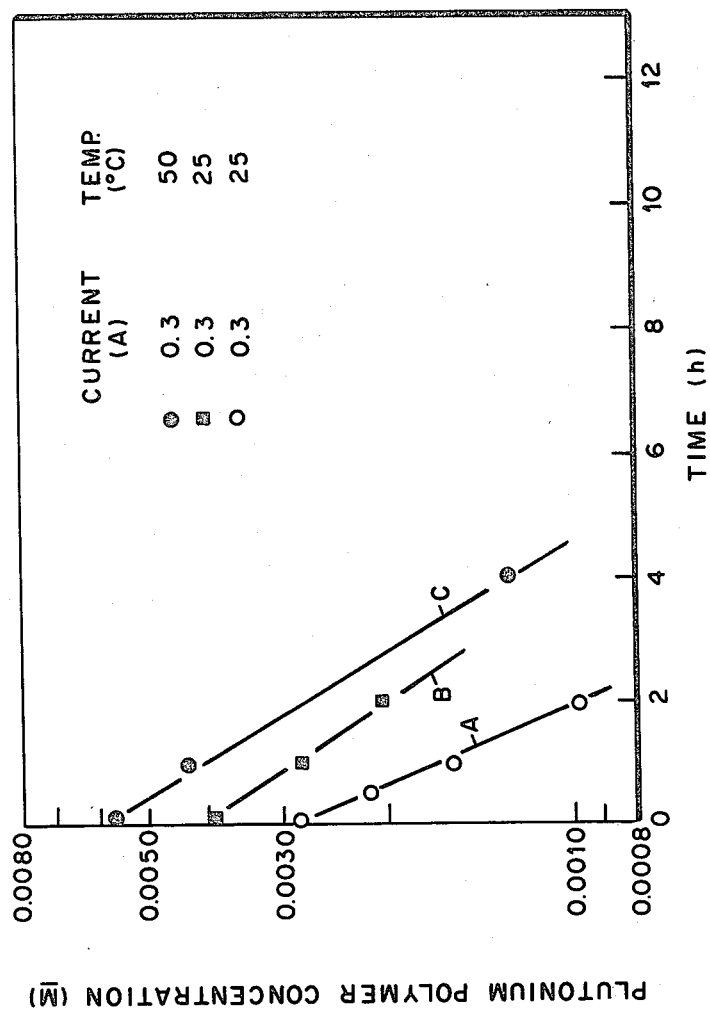

METHOD OF REMOVING PU(IV) POLYMER FROM NUCLEAR FUEL RECLAIMING LIQUID

BACKGROUND OF THE INVENTION

Plutonium is normally recovered from spent nuclear reactor fuel by dissolving the fuel in aqueous nitric acid and then extracting plutonium from the acid solution. A serious difficulty encountered in this process results from the hydrolysis and subsequent polymerization of tetravalent plutonium when the nitric acid fuel dissolving solution is diluted. The thus-formed colloidal plutonium, which will be designated hereinafter as Pu(IV) polymer, is inextractable from the acid solution by the commonly employed solvent extraction and ion exchange processes and tends to precipitate at various stages in the fuel reclamation system, which not only results in loss of plutonium in waste streams but also can plug process equipment and cause a criticality problem.

The formation of Pu(IV) polymer and the nuclear fuel processing problems which it causes have been described in the following publications:

1. "The Preparation and Properties of Some Plutonium Compounds, Part V. Colloidal Quadrivalent Plutonium", published in J. Chem. Soc., p. 3358, in 1956, by D. W. Ockenden and G. A. Welch.
2. "Hazards and Experimental Procedure Evaluation For: Studies on the Polymerization and Hydrolysis of Plutonium in Uranyl Nitrate and Nitric Acid Solutions at Elevated Temperatures", published in 1963 by R. E. Biggers and D. A. Costanzo of the Oak Ridge National Laboratory.
3. "A Study of the Polymerization, Depolymerization, and Precipitation of Tetravalent Plutonium As Functions of Temperature and Acidity by Spectrophotometric Methods: Preliminary Report", published in 1963 by R. E. Biggers and D. A. Costanzo of the Oak Ridge National Laboratory.
4. Volume 1, section 13-2.2, "Plutonium Handbook, A Guide to the Technology", published in 1967 by Gordon and Breach, Science Publishers.

It was disclosed in the publication listed as Item 3 above that Pu(IV) polymer can be depolymerized to ionic plutonium by treating the polymer with 5 molar nitric acid at temperatures in the range of 25°–95° C. Eliminating Pu(IV) by such treatment requires the addition of a large amount of acid to the low-acid nuclear fuel reclaiming streams in which Pu(IV) polymer is formed, which is undesirable.

The publication listed above as Item 4 states that strong complex-forming agents such as fluoride and sulfate ions promote depolymerization of Pu(IV) polymer. However, it will be readily understood by persons skilled in the art of nuclear fuel reclamation that it is undesirable to add fluoride or sulfate ions to process streams, which must be recycled and cannot be adulterated. Fluoride ions would also cause severe corrosion in the process equipment that is generally used in nuclear fuel reclamation.

SUMMARY OF THE INVENTION

It is therefore an object of this invention to eliminate Pu(IV) polymer from an aqueous nitric acid solution.

Another object of the invention is to remove Pu(IV) polymer from an aqueous nitric acid solution without adding anything to the latter that would interfere with its further use in nuclear reactor fuel recovery.

These objects are achieved by passing electric current through an aqueous nitric acid solution in which Pu(IV) polymer has formed, thereby destroying the polymer and placing plutonium in the solution in a form that can then be extracted from the solution by use of a suitable solvent such as a mixture of tri-n-butyl phosphate and dodecane.

DESCRIPTION OF THE DRAWING

The single FIGURE is a graph of test data obtained by applying electric current to solutions containing different amounts of Pu(IV) polymer aqueous nitric acid.

DETAILED DESCRIPTION OF THE INVENTION

The depolymerization of Pu(IV) polymer in an aqueous nitric acid solution was demonstrated in tests wherein direct electric current was passed between platinum electrodes immersed in the polymer-containing solution. The current was maintained at a potential sufficient to produce a slight gassing of the solution, and it was found that reversal of the electrode polarity at approximately 10 minute intervals improved the effectiveness of the current in eliminating the Pu(IV) polymer. The method of the invention was found to be effective for depolymerizing aged or unaged Pu(IV) polymer in 0.3 to 8.0 M $HNO_3$ solutions at ambient temperature. It was also found that the rate of depolymerization of the polymer increased with increase in electrode surface area and current flow. Uranyl nitrate which is present with plutonium in aqueous nitric acid solutions used for reclaiming spent nuclear reactor fuel was found to increase the effectiveness of the current in depolymerizing Pu(IV) polymer. A specific test example of the method of the invention is presented hereinafter for the purpose of illustration.

A 10.0 ml portion of 0.007 M Pu(IV) polymer solution was diluted by adding an equal volume of 0.8 M $HNO_3$ solution. Two platinum electrodes with surface areas of 11.2 $cm^2$ and 20.36 $cm^2$, respectively, were inserted into the polymer-acid solution contained in a glass beaker, the solution being at ambient temperature. Direct current of approximately 0.1 ampere was passed between the electrodes, which produced mild gassing of the solution. The direction of current flow was reversed at about 10 minute intervals. After one hour, absorption spectral analysis of the solution showed that a small percentage of the original amount of the Pu(IV) polymer remained in the solution. Electrolysis of the solution was continued for three additional hours, at which time the absorption spectral analysis showed no polymer present in the solution.

In the accompanying graph, the lines A, B and C, respectively, show the decrease in Pu(IV) polymer in 0.6 M nitric acid solution initially containing three different concentrations of the polymer, concentrations of the polymer being represented by ordinate points and the time of electrolysis of the solutions being represented by corresponding abscissa points.

It is believed that passing direct electric current through an aqueous nitric acid solution containing Pu(IV) polymer converts plutonium of the polymer to $Pu^{3+}$ and $PuO_2^{2+}$ ions, and the $Pu^{3+}$ and $PuO_2^{2+}$ ions are in turn converted to $Pu^{4+}$ ions according to the following equation, if the hydrogen ion concentration of the solution is $\geq 0.3$ M (which hydrogen ion concentration prevents reforming of Pu(IV) polymer in the solution):

$$2Pu^{3+} + PuO_2^{2+} + 4H^+ \rightarrow 3Pu^{4+} + 2H_2O$$

Hence the method of the invention includes the step of passing direct current through an aqueous nitric acid solution which contains Pu(IV) polymer to form $Pu^{4+}$ ions in the solution, followed by a second process step in which the $Pu^{4+}$ ions are extracted from the solution. This $Pu^{4+}$ extraction can be effected by known procedures, such as by contacting the acid solution with a solution containing about 30% tri-n-butyl phosphate and 70% hydrocarbon diluent (such as dodecane). The $Pu^{4+}$ extraction can also be accomplished by known procedures using an ion exchange resin. As pointed out hereinbefore, the aforesaid plutonium extraction processes are ineffective for directly removing Pu(IV) polymer from an aqueous nitric solution.

What is claimed is:

1. A method of processing a nuclear fuel reclaiming solution containing water, nitric acid, and Pu(IV) polymer, comprising:

passing electric current through said solution to depolymerize said Pu(IV) polymer, the hydrogen ion concentration of the solution being at least 0.3 molar; and separating from the solution plutonium ions obtained by depolymerization of said Pu(IV) polymer.

2. The method of claim 1 wherein the direction of flow of said electric current through said solution is periodically reversed.

* * * * *